United States Patent [19]

Simmonds, Jr. et al.

[11] Patent Number: 4,650,538

[45] Date of Patent: Mar. 17, 1987

[54] LINEAR DEPOSITION APPARATUS

[75] Inventors: Robert C. Simmonds, Jr., Topsfield; Andrew J. Gilbride, Swampscott; Albert I. Morse, Beverly, all of Mass.

[73] Assignee: USM Corporation, Farmington, Conn.

[21] Appl. No.: 841,401

[22] Filed: Mar. 19, 1986

Related U.S. Application Data

[63] Continuation of Ser. No. 729,897, May 2, 1985, Pat. No. 4,592,798, which is a continuation of Ser. No. 452,964, Dec. 29, 1982, abandoned.

[51] Int. Cl.$^4$ .............................................. B05C 5/02
[52] U.S. Cl. .................................. 156/578; 12/61 A; 12/146 D; 118/213; 156/283; 427/197; 427/282
[58] Field of Search ............... 12/146 D, 61 A, 61 B; 101/114–117, 129; 118/202, 213, 308; 156/230–232, 283, 540, 556, 578; 427/197, 282

[56] References Cited

U.S. PATENT DOCUMENTS

| 3,316,573 | 5/1967 | Chaplick et al. | 12/146 D |
|---|---|---|---|
| 3,342,624 | 9/1967 | Kamborian | 118/120 X |
| 3,608,521 | 9/1971 | Gopel | 118/202 |
| 3,973,284 | 8/1976 | Newton et al. | 12/146 D |
| 4,177,098 | 12/1979 | Gorini et al. | 12/146 D X |
| 4,352,712 | 10/1982 | Paul | 156/230 X |
| 4,475,477 | 10/1984 | Morse et al. | 118/202 X |
| 4,528,710 | 7/1985 | Simmonds et al. | 12/146 D |

FOREIGN PATENT DOCUMENTS

1528937 10/1978 United Kingdom .

Primary Examiner—Robert A. Dawson
Attorney, Agent, or Firm—Spencer T. Smith

[57] ABSTRACT

A machine for applying a configuration of reinforcement/stiffening or decorative material in powder form to a receiving surface, for subsequent fusing, cooling and pressing to a substrate such as a shoe upper. The machine comprises a deposition station, a heating station and a press station. A tensioned receiving belt receives the configuration of powder through a cut-out in the bottom of a swept screen frame. The receiving belt is supported from beneath during the deposition activity to control the thickness of the powder deposit. The receiving belt is shuttled in a displaceable frame in a series of steps to the successive stations for melting the powder and subsequent cooling and adhesion of the melted powder to the substrate such as an unreinforced shoe upper. The cut-out may have a peripheral gasket arranged partially therearound to displace at least part of said cut-out from said receiving surface, leaving sufficient volume therebetween for filling by the powder as a three-dimensional (tapered) configuration.

3 Claims, 7 Drawing Figures

LINEAR DEPOSITION APPARATUS

This application is a continuation of application Ser. No. 729,897, filed May 2, 1985, now U.S. Pat. No. 4,592,798 which in turn is a continuation of application Ser. No. 452,964 filed Dec. 29, 1982 now abandoned.

BACKGROUND OF THE INVENTION (1) Field of the Invention

This invention relates to deposition machinery useful for manufacturing reinforcement/stiffening or decorative means applicable to a flexible substrate, and more particularly to shoe machines for producing reinforcing or decorative means for shoe uppers prior to their assembly on a shoe last.

(2) Prior Art

The shoe and apparel industry have for many years provided reinforcement/stiffening or decorative means to their products. Manufacturers of pajamas, blue jeans, sports clothing, including sports equipment such as gloves, caps with visors, and the like, as well as shoe manufacturers have stitched, glued or applied layers of reinforcing material to their products for a variety of reasons. It has been standard for the shoe industry to apply the reinforcement/stiffening means as a layer of molten thermoplastic material adherable to a shoe upper. Early attempts at reinforcing or stiffening a shoe upper have included providing preformed stiffener elements or counters, which are inserted into a shoe upper, prior to lasting. Separate moldable sheet materials softenable by heating or by solvent have been inserted in the shoe uppers prior to lasting and are shaped in the course of lasting to a desired configuration which configuration they retain by being allowed to harden before removal of the shoe upper from the last. Shoe uppers have also been stiffened by impregnating a shoe component with a solution or dispersion in a volatile liquid vehicle of hardenable stiffener materials prior to lasting of the shoe upper, the shoe upper being stiffened by hardening of the impregnating material after the shoe is lasted.

One such way of stiffening shoe uppers is shown in U.S. Pat. No. 3,316,573 to Chaplick et al, wherein a shoe upper has a selected area in which a resiliently flexible stiffener element is fluidly deposited heated to a moldable point, and brought to a three-dimensional configuration which it will retain on cooling.

Another arrangement for coating shoe parts is shown in U.S. Pat. No. 3,342,624 to Kamborian, wherein a stencil plate rests upon a shoe upper, a concave support surface holds the combination, whereupon a doctor blade wipes across the plate to deposit a fluid stiffener into the depression in the shoe upper.

A more recent arrangement for stiffening shoe components, is shown in U.S. Pat. No. 3,973,285 to Babson et al, comprising an arrangement for depositing a molten charge of thermoplastic on a shoe upper held in a margin clamping means.

The prior art arrangements may occasionally work well, but they have difficulty producing a stiffener of uniform thickness over seams and overlaid patterns. The adhesion of the stiffener at its edges is often poor. Rough edges, and strings or "spider webs" characteristic of the process all may be present. The machines may leak their molten material out of connecting joints, nozzles may drool and patterns require time and patience to change.

The materials usable in these prior art machines are limited to certain viscous flow and heat stability characteristics which necessitate careful tailoring, often compromising performance of the final product. These specialty materials are also more costly.

Thus it is an object of the present invention to provide an apparatus which will overcome the shortcomings of the prior art.

It is a further object of the present invention to provide a reinforcement/stiffening or decorative means in a desired configuration as an individual piece or as a part of a substrate such as a shoe upper or piece of cloth-type material, which configuration may be made from a wide choice of low cost polymeric materials having superior physical characteristics which may be readily changed to facilitate various shoe upper patterns or styles or reinforcement/stiffening or decorative requirements of the garment with conveniently made low cost stencil tooling.

It is yet a further object of the present invention, to provide an apparatus which will manufacture a smooth stiffened/reinforced shoe upper, without the inconveniences of the prior art.

BRIEF SUMMARY OF THE INVENTION

The present invention includes an apparatus for reinforcing and/or stiffening and/or decorating substrates which may be flexible, such as the underside of shoe uppers or portions of clothing or the like, by the application thereon of a fused powdered material. The apparatus comprises an elongated frame member having an array of successive work stations arranged thereon. The first station comprises a deposition station. The second station comprises a heat station, and the final station comprises a join and cool or press station. The deposition station has a horizontal receiving belt of rectangular configuration. The receiving belt is tensionally mounted on a frame which is movable or shuttleable into and out of the successive stations. The receiving belt acts as a support surface and is made from a thin web of woven glass fibers or metal screen coated with a low adhesion, plastic, heat resistant material which may incorporate a release agent therewith. A stencil means is hingedly disposed above the receiving belt. The stencil means comprises a wire mesh screen preferably sandwiched between an overlaid covering of smooth impervious material and a lowermost surface of foil, each adhering to their side of the screen and to one another through the screen, each having a matching, aligned cut-out exposing the screen; the mesh and the covering being held in a frame which is traversed by a carriage functioning to disperse reinforcing/stiffening material in powder form from a conduit secured to a supply hopper thereabove. A gasket of varying thickness may be arranged around at least a portion of the cut-out on the bottom side of the wire mesh screen to permit a pre-determined "volume" of powdered material to be pushed therewithin. The powdered material dispersed from the hopper is preferably a polyethylene, an ionomer or an ethylene vinyl acetate, if the machine is used for shoe box toes. For other types of reinforcement, various formulations of vinyl and nylon may be used. The dispenser carriage supports a pair of wiper blades and is movable across the stencil by actuatable means such as a stepping motor engaged with a rack and pinion gear arrangement, or a cable cylinder and pulleys arranged adjacent the carriage and the screen frame.

The heat station is disposed on the elongated frame member of the apparatus, transversely adjacent the deposition station. The heat station comprises a lower planar surface of preferably metal construction having a plurality of heating elements heatable to 375°-500° F. arranged therein. The lower planar surface also has a plurality of orifcii arranged thereacross, in fluid communication with a vacuum source. The heat station includes an upper planar surface hingedly attached at one end thereof, to the elongated frame member. The upper planar member comprises a plurality of radiant heating elements having a temperature range of about 400°-700° F. in a parallel array therein.

The press and/or cool station disposed at the end of the elongated frame is comprised of cool and join means. A lower planar block is in fluid communication with a refrigeration means. An upper support channel arrangement may receive a frame which holds an unreinforced flexible substrate such as a shoe upper or piece of cloth, held by its margin therein. The "inner" side of the flexible substrate, i.e. the shoe upper, is disposed towards the lower refrigerated block. The upper support channel arrangement may be movably held above the lower block by a reciprocation means such as a double acting piston and cylinder unit secured to the frame member. Actuation of the piston and cylinder unit at the final press station effectuates movement of the support channel arrangement towards and away from the lower refrigerated block.

The frame of the shuttleable receiving belt is slidably mounted on a pair of horizontal guideways, which frame is movable thereon by pressurizable means to move the belt from the first station, then to the second station and then finally to the third station, and back again to the first station. The frame of the receiving belt is movable upwardly and downwardly with respect to the guideways, by frame height adjusting means such as a pressurizable cylinder, to ensure contact of the belt with the stations during their operating time, and to ensure separation between the belt and the station during non-operating times. The receiving belt, when disposed at the deposition station, has a lower support means thereunder and secured to the elongated frame, synchronizably movable upwardly and downwardly with respect to the stencil means, to provide backing thereagainst during application of powder thereon, in the deposition process.

The process of operation of the flexible substrate, (i.e. shoe upper) reinforcing/stiffening/decorating apparatus, a quantity of fusible polymer powder such as an ionomer, a polyethylene or an ethylene vinyl acetate of preferably a 35 mesh size is caused to flow from the hopper through the conduit and into the dispenser-carriage. The wiper blades are caused to sweep across the smooth upper surface of the stencil, sweeping the fusible powder into the configured cut-out thereacross. Each wiper blade is alternately raised from the upper surface of the stencil, by camming means, depending on the direction of sweep of the blades. The receiving belt is pushed by the lower support means thereunder into contact with an arrangement of spacer means such as the peripheral gasket type of spacer means on the bottom side of the stencil means. The receiving belt thus has deposited on it a configuration of powder thereon, the powder being applied in a particular desired uniform thickness, or a varying thickness or taper, depending upon the way the spacer means is arranged around the cut-out on its bottom side and upon the way shims (if any) have been placed on the lower support. The spacer means may include a full peripheral gasket or a partial gasket and therefore selectively space the receiving belt from a portion of the bottom side of the stencil means cut-out.

Upon receipt of a proper control signal from a proper source, the lower support and any shim or shims thereon under the receiving belt is caused to move downwardly, and a pneumatically actuated cam is caused to move a cam follower and gradually raise the lower surface of the stencil and dispenser assembly from contact with the receiving belt surface in such a manner as to minimize the in-rush of "wind" caused by the displacement of air when the dispenser assembly is lifted, as well as to minimize any electrostatic effects. Thus the three-dimensional configuration of powder produced by the stencil pattern and the spacer and shim means are transferred to the receiving belt. A further proper control signal initiates pressure in the shuttle means to cause the frame of the shuttleable receiving belt to move transversely on its horizontal guideways, from the first "deposition" station, to the second "heat" station. Acceleration of the receiving belt and its frame is carefully limited so that the configuration of powder is not disturbed. While various powder particle sizes and formulations and receiving belt conditions will cause the tolerance of the configurations to vary, acceleration forces are generally kept below 0.8. g's.

At the "heat" station, the receiving belt is brought into touching contact with the lower planar surface thereof. Upon contact with switches at the second station the receiving belt frame, lowered into contact with the lower planar surface by actuation of the frame height adjusting means, i.e. pressurization of its cylinder therebeneath, and the vacuum source in the lower planar surface is actuated, causing the receiving belt to be drawn tightly against the lower planar surface to improve heat transfer to the powder by-conduction of heat from heating elements in the lower planar surface and radiation from the upper planar surface.

After the configured powder on the receiving belt has been heated and fused into a molten three-dimensional viscous mass, the receiving belt may be raised from the lower planar surface by reactuation of the frame height adjusting means, i.e. depressurization of the cylinder therebeneath and shuttled transversely by actuation of further pressure in the pressure means which causes the frame of the shuttleable receiving belt to move on its guideways to the third station for joining then cooling with an unreinforced substrate such as a shoe upper or piece of cloth or, in the case where an individual loose product is desired, for just cooling thereof. The receiving belt is lowered into close proximity with the upper surface of the lower planar block in a manner similar to that of the heating station, as well as by the actual pressing of a substrate thereagainst, which helps cool the fused configuration on the low thermal mass receiving belt. A shoe upper in its support frame may be simultaneously pressed against the fused configuration, to place the reinforcement/stiffening or decorative material thereagainst, while it is still tacky, insuring adhesion. The chilling effect of the lower planar block allows the release of the fused configuration from the receiving belt when the substrate, i.e. shoe upper in its support frame is retracted by actuation of the piston means, upwardly, from its contact with the receiving belt. The release action from the receiving belt may be optimized by the use therewith of a variety of commercial release agents such as silicone oil, or lecithin, or dry preparations of powdered mica, silica and calcium carbonate or a combination of these elements. The frame holding the now reinforced/stiffened or decorated substrate, i.e. shoe upper is slidably removable from the upper support channel arrangement, and a subsequent unreinforced shoe upper in a frame may be inserted therein, with the "inner" side of the substrate in the case of shoe uppers, being directed downwardly, the frame being pushable into the channels in the upper support arrangement, and the receiving belt and its frame being raised by the frame height adjusting means and being returnable to the first station by pressurization of its pressurizable means to effect its motion on the guideway, to begin the cycle anew.

In the case where individual reinforcement/stiffening or decorative pieces are desired, the lower foil surface of the stencil and/or the receiving belt may be provided with a release surface preferably made of a porous material from which the piece may easily be peeled. The purpose of the porosity is to ensure that air bubbles on and in the surface of the molten mass may escape, thereby facilitating a high quality bubble free product.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

Figure 1:
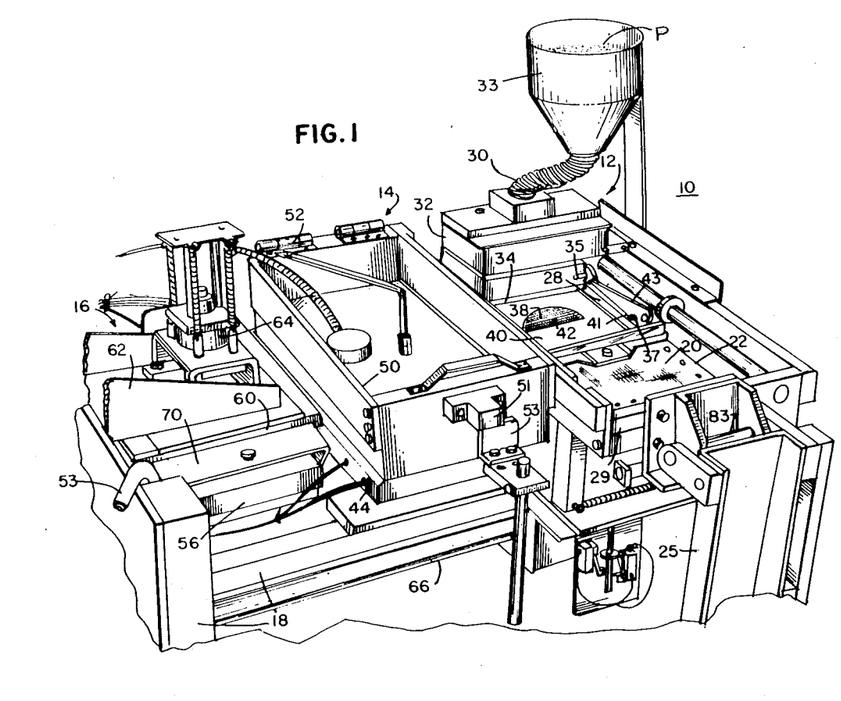
FIG. 1 is a perspective view taken generally from the front of a machine constructed according to the principles of the present invention.

Referring now to the drawings in detail, and particularly to FIG. 1, there is shown a linear powder deposition machine 10 useful for the reinforcement and stiffening and/or decorating of substrates such as cloth or of shoe uppers. The machine 10 comprises a linear arrangement of three work stations, the first being a powder deposition station 12, the second station being a heat station 14, and the third station being a press and cool station 16. The three work stations 12, 14 and 16 are supported on a common elongated frame 18. The deposition station 12, shown more clearly in FIGS. 2, 3 and 4. has shown thereat, a horizontally arranged surface or receiving belt 20 stretched across a belt holder 22. The receiving belt 20 and belt holder 22 comprise a portion of a movable unit 24 which is movable into and out of the remaining work stations 14 and 16. Referring to FIG. 4, the belt 20 is held taut by a first holder member 22A secured to a lower platen 24A of the movable unit 24. A second holder member 22B biases the belt 20 by securement to a pair of uprights 22C, each being pivotably held near its midpoint thereof by a bracket 22D secured to the lower platen 24A. The lower end of each upright 22C has a spring 22E which is attached to the uprights holding the first frame member 22A securely to the lower platen 24A. A pair of biased opposing frame members 23A and 23B are each secured to an upright bracket 23C which is pivotally biased to the lower platen 24A by captive means therearound to bias the brackets 23A and 23B accordingly, as shown in FIG. 4.

Figures 3, 3A:
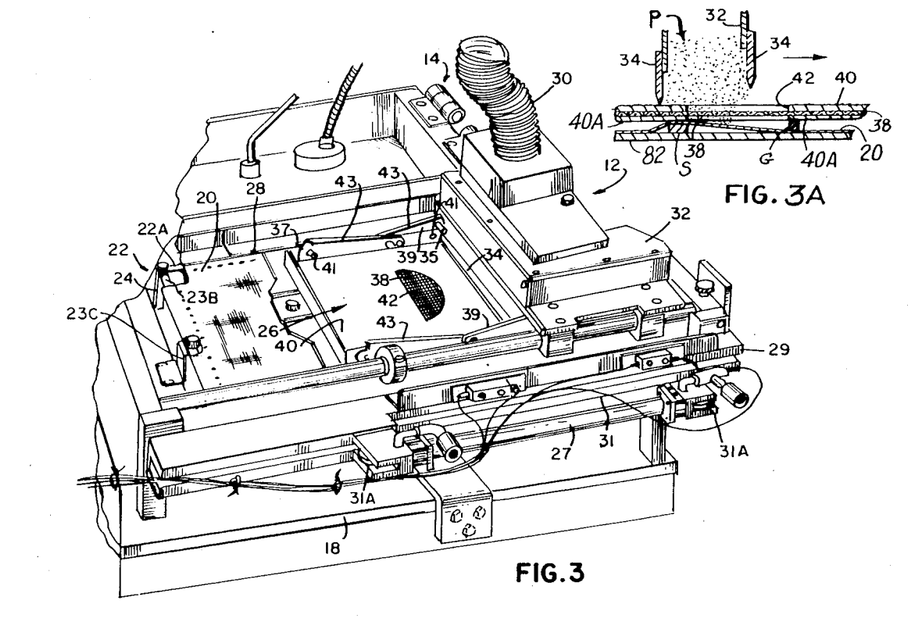
FIG. 3 and FIG. 3A are a perspective view and a partial side elevational view respectively of the first work station of the present invention.
Figure 4:
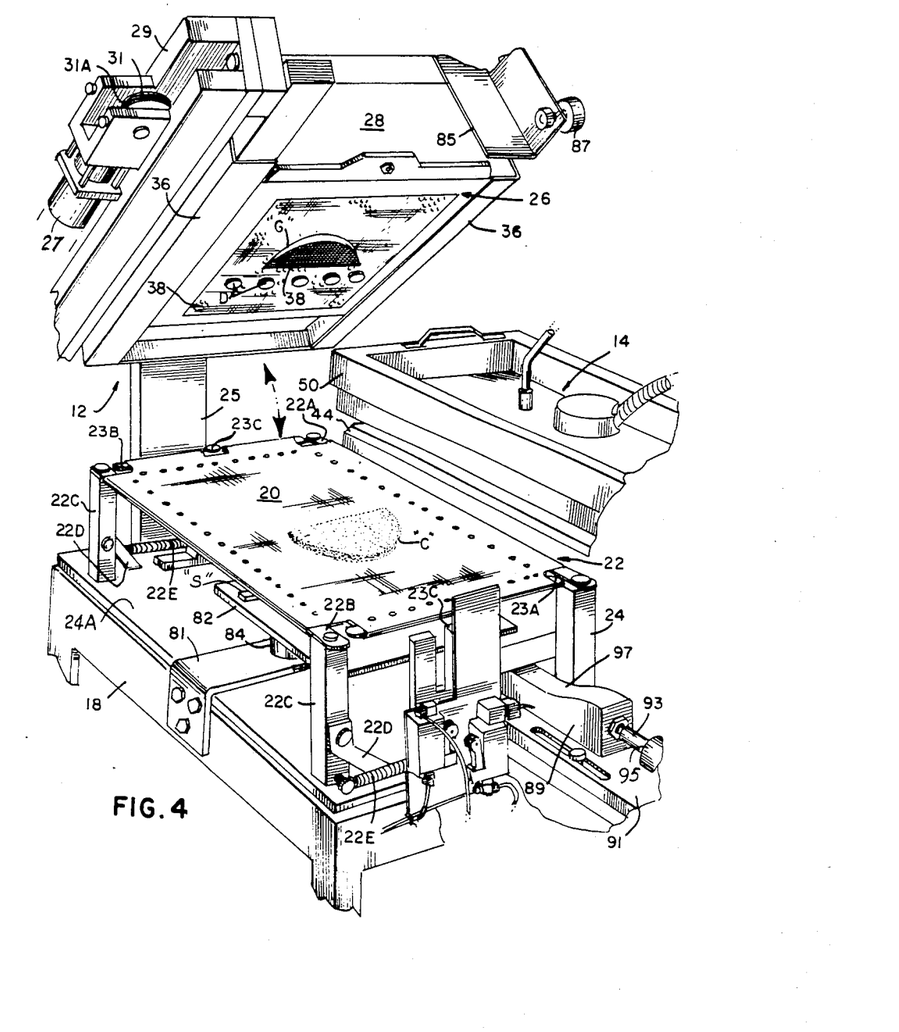
FIG. 4 is a perspective view taken generally from the front of the first work station of the present invention, in an opened configuration.

A stencil means 26, shown in FIGS. 3 and 4, is hingedly attached to a support 25 extending upwardly from the elongated frame 18. The stencil means 26 comprises the lower surface of a screen frame 28 which receives a reinforcing/stiffening or decorative material "P" in powder form from a supply hopper 33, through a flexible conduit 30 to a dispenser-carriage 32 which dispenser-carriage 32 is disposed within the screen frame 28 and traverses across it by actuation of a double acting cable cylinder 27 secured to a structure 29 which supports axial bearing rods upon which the dispenser-carriage 32 moves. A cable 31 is arranged about a pair of sheaves 31A, the cable 31 being attached from each side of a piston in the cylinder 27 to a contact point in the side of the dispenser-carriage 32, to pull it accordingly, when the cable cylinder 27 is actuated by a proper signal from a pressure source, not shown. The dispenser-carriage 32 includes a pair of wiper blades 34 which are shuttleable across the length of the screen frame 28 against the stencil means 26 when the carriage 32 is actuated thereacross. The wiper blades 34 (also partially shown in a side elevation view in FIG. 3A), one on each side of the carriage 32, are biased downwardly with respect to the carriage 32, but are movable upwardly and downwardly with respect thereto. Each wiper blade 34 has a pin 35 on each end thereof. A pair of cam levers 37 and 39, are arranged on the edge of the screen frame 28 adjacent the blade pins 35. Each lever 37 and 39 is pivotable about an axis 41 at its outer end, and is biased to facilitate the respective upward and downward movement of the particular wiper blades 34, depending upon the direction of traverse of the dispenser-carriage 32. The trailing wiper blade 34 may be dragged along the surface of the stencil means 26 past the cut-out 42, and the leading wiper blade 34 is gradually raised, as shown in the sectional view in FIG. 3A where the dispenser-carriage 32 is shown moving to the right. When the carriage 32 reverses its direction of travel a newly "bottomed-out" (previously raised) wiper blade 34 sweeps the stencil top surface 40 and the other wiper blade 34 is lifted upwardly in its sweep as its proceeds towards its respective end of the screen frame 28. It is to be noted that other means such as a pressurizable piston and cylinder could be hingedly arranged between each wiper blade 34 and the dispenser-carriage 32 to pull up and push down each wiper blade 34.

The stencil means 26, described more particularly in U.S. Pat. No. 4,475,477 entitled, "Stencil Apparatus", by A. Morse et al and incorporated herein by reference, is slidably received in a pair of channels 36 attached to the bottom of the sides of the structure 29, and is comprised of a wire mesh screen 38 and an overlay of smooth stiff impervious material 40, as shown in FIGS. 1, 3, 3A and 4. The powder "P" used in stiffening shoe uppers is preferably 35 mesh, and possibly a finer mesh powder, such as 50 mesh to 100 mesh which is preferable for more finely defined patterns of intricate designs of shoe reinforcements. The powder types used with this apparatus are preferably polymers such as ionomer, polyethylene, or ethylene vinyl acetate or a combination of these. The wire mesh screen 38, is of larger mesh, typically 8 to 30 to allow the powder "P" from the dispenser 32 to pass therethrough. The smooth material 40 will have at least one cut-out 42 as shown in FIG. 3, which cut-out 42 will have the overall configuration of the shape of the desired reinforcement/stiffener or decorative powder to be applied to the unreinforced substrate, i.e. shoe upper at the third work station 16. A foil-like lower surface 40A may be adhered to the lower side of the screen 38 having a similar cut-out 42 in matched alignment with the cut-out 42 in the upper surface 40. The upper and lower surfaces 40 and 40A may be pressed so as to adhere through an adhesive therebetween, to one another through the mesh openings in the screen 38.

Figure 2:
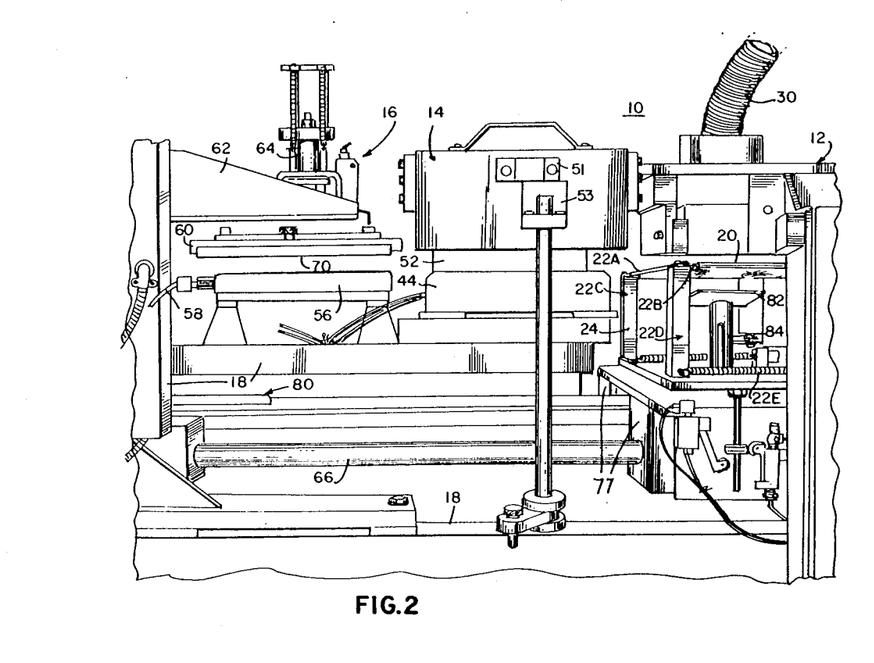
FIG. 2 is a elevational view of the front of the machine shown in FIG. 1.
Figure 5:
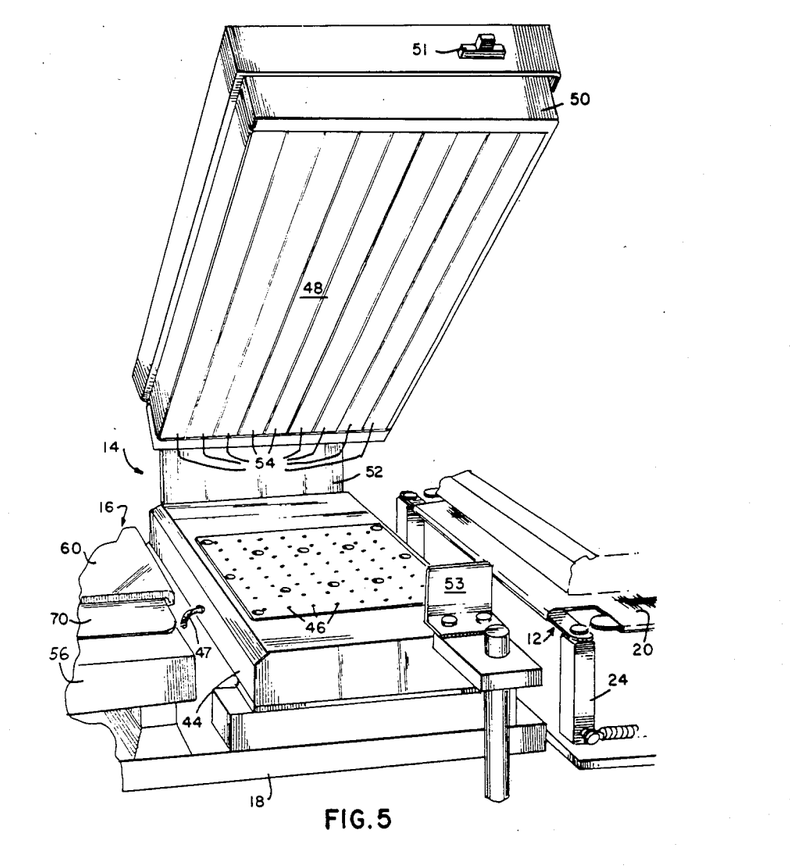
FIG. 5 is a perspective view of the second work station of the present invention, in an opened configuration.

The second work station, comprising the heat applying station 14, is secured to the frame member 18, transversely adjacent the deposition station 12, as shown in FIGS. 1, 2 and 5. The heat applying station 14 comprises a lower planar surface 44 having a plurality of electric heating elements, not shown, arranged therewithin. The lower surface 44 also has a plurality of orifcii 46 disposed thereacross, in fluid communication via a vacuum line 47 to a vacuum source, also not shown. The heat applying station 14 also comprises an upper planar surface 48 arranged in a housing 50 hingedly connected by a bracket 52 at one end of the housing 50 to the frame member 18. A stop bracket 51 at the other end of the housing 50 strikes a limit bracket 53 which acts to control the closeness of the upper planar surface 48 to the lower planar surface 44. The upper planar surface 48 comprises a plurality of radiant heating elements 54 energized from a proper electrical source, which elements 54 are arranged in a parallel array within the housing 50.

Figure 6:
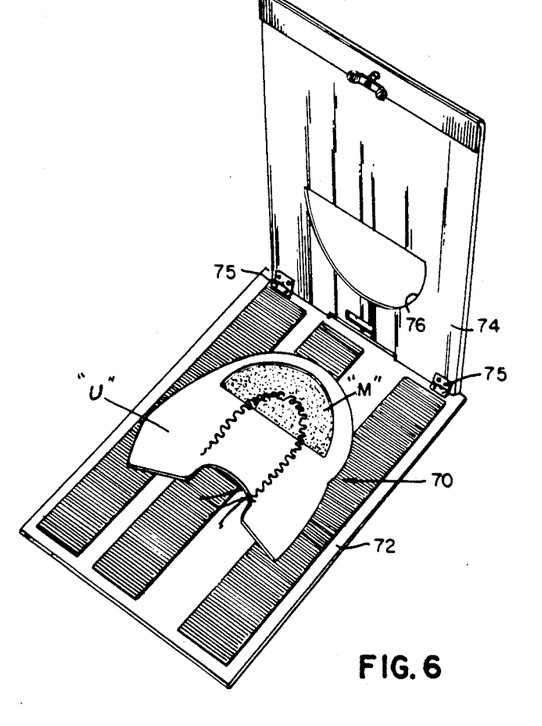
FIG. 6 is a perspective view of a pallet with a shoe upper arranged therein.

The third station 16 is a press station comprising a join and/or cool means, as shown in FIGS. 1 and 2. The press station 16 includes a lower planar block 56 which is in fluid communication, through proper conduits 58, to a refrigeration source, not shown. The lower planar block 56 is secured to the elongated frame member 18. An upper support channel 60 is in vertically movable registration with a bracket 62 which is also attached to a vertical portion of the frame member 18. A pressurizable double acting piston and cylinder unit 64 is secured between the top of the upper support channel 60 and the bracket 62. The piston and cylinder unit 64 is connected to a pressurizable fluid source actuated by means of a proper signal from a switch attached adjacent to one of a pair of guideways 66 running through the lower portions of the three work stations 12, 14 and 16. The upper support channel 60 slidably receives a substrate holding pallet or frame 70, which pallet 70 is shown in an open position in FIG. 6, the substrate in this embodiment, comprising a shoe upper "U". The pallet 60 comprises two rectangular planar members 72 and 74 having a hinge 75 arranged therebetween on one side thereof. A pad, not shown, is secured to the inner side of one of the planar members 72 and 74, the substrate, (if any being desired), in this embodiment being the unreinforced shoe upper "U", is placed over the pad. A cut-out 76 is arranged in the other planar member 74 which cut-out 76 conforms with sufficient clearance to the pattern of reinforcement/stiffener or decoration desired on the substrate/shoe upper "U". The pad causes the "to be reinforced/stiffened" or "decorated" portion of the substrate/shoe upper "U" to be pressed slightly outwardly through the cut-out 76 in the planar member 74, when they are closed together. FIG. 6 shows a layer of fused material "M" already applied as a box toe to the shoe upper "U".

The frame 24 supporting the receiving belt 20 is slidably mounted on the guideways 66, the frame 24 being movable on the guideways 66 by interaction of a pressurizable double-acting piston and cylinder unit 80 one end of which is secured between the vertical portion of the frame member 18 and a piston rod, not shown, is attached to the frame 24 supporting the receiving belt 20. Other motive means, such as a stepping motor with a rack and pinion gear arrangement could be utilized here. Each work station 12, 14 and 16 has a signal device such as a switch, not shown, on its adjacent portion of the guideway 66, to actuate the subsequent steps in the operating cycle of the machine 10.

The receiving belt 20 has a lower planar support 82 movable toward and away from the bottom thereof, actuatable by double-acting pressurizable means 84, upon receipt of a proper signal, to provide backing to the receiving belt 20 during application of the configured reinforcement/stiffening or decorative powder thereon, in the deposition process. The double-acting pressurizable means 84 is secured to a bracket 81 which itself is attached to a side of the frame 18, as shown in FIG. 4. A shim "S" may be arranged on the top side of the lower planar support 82 as shown in FIGS. 3A and 4. The shim "S" may comprise a strip of gasket material and is disposed so as to distort and press the receiving belt 20 against the bottom side of the foil 40A on the mesh screen 38 where there is no peripheral gasket around the cut-out 42. The shim "S", is preferred when the product made is for reinforcing a shoe upper, because a sharp taper or scarf may be produced on the powder configuration from the edges of the peripheral gasket to the opposing (no peripheral gasket) edge of the cut-out 42. If no shim "S" is arranged on the lower planar support 82 beneath the receiving belt 20, the product may be of gradual tapered configuration, depending on the thickness and taper of the peripheral gasket.

The structure 29, on which the screen frame 28 is mounted, has a hinge 83, shown in FIG. 1, on one end thereof, which is secured to the elongated frame 18, and a bracket 85 is attached to the mid-point of the other end thereof, as shown in FIG. 4. A cam following wheel 87 is mounted on the lower end of the bracket 85. A cam 89, is arranged on a track 91, movably connected by a rod 93 to a double-acting pressurizable cylinder 95 towards and away from the belt frame 24. The cam 89 has a gradually increasing inclined surface 97 on which the following wheel 87 turns.

In operation of the shoe upper reinforcement/stiffener or decorative powder applying machine 10, a quantity of fusible powder is discharged from the hopper 33, through the flexible conduit 30 and into the dispenser-carriage 32. The dispenser-carriage moving means, here the cable cylinder 27 attached to the dispenser-carriage 32, upon receipt of a proper signal, acts with the cable 31 secured to the piston in the cylinder 27 to move the carriage 32 on the guide rods of the structure 29 across the screen frame 28. The wiper blades 34 are thus caused to sweep across the stencil top surface 40, the stencil 26 being arranged on the bottom of the screen frame 28, sweeping the powder through the configured cut-out 42, as shown in FIG. 3A, and onto the receiving belt 20 supported therebelow by the lower planar support 82. The three dimensional shape of the deposited powder on the receiving surface 20, may be controlled by the shim "S" arranged on the top-side of the lower planar support 82. A scarf or sharp taper is thus obtained for a box toe in shoe manufacturing, when the shim "S" is used in conjunction with the peripheral gasket "G", and dot spacers "D" which are referred to below. The receiving belt 20 may thus have deposited thereon a three-dimensional configuration "C" of powder thereon, of uniform or gradual tapering thickness, as shown in FIG. 4 providing a "feathered" edge or a sharp taper or "scarf" on the finished product, because of a peripheral gasket "G" of tapering thickness disposed partially around the bottom surface of the cut-out 42, permitting portions of the receiving belt 20 to be pressed closer to the wire mesh screen 38 bottom of the cut-out than those portions of the cut-out 42 having the thicker segments of the peripheral gasket "G". Upon receipt of a proper signal, the lower planar support 82 under the receiving belt 20, which presses the receiving belt 20 against the bottom of the wire mesh screen 38, is withdrawn and lowered by the double acting pressurizable means 84 thereunder. The pressurizable cylinder 95 is then actuated by a proper signal to advance the cam 89 towards the belt frame 24. The structure 29, screen frame 28 amd stencil 26 are thus lifted, gradually at first, from the surface of the receiving belt 20. Thus the configuration of powder deposited on the receiving belt 20 is brought free from contact with the stencil means 26, including the spacers or gaskets thereon. The "rise" of the cam 89 is preferably a modified sinusoidal shape, moving the stencil 26 upwardly at a slow rate initially to avoid the deleterious effects of inrushing air and related static electrical phenomena on the delicate three-dimensional powder configuration on the receiving belt 20 prior to its being shuttled to the second work or heating station 14. The selection of the position and use of the "dot" spacers D, shown in FIG. 4 and in U.S. Pat. No. 4,475,477 entitled "Stencil Apparatus", by A. Morse et al and incorporated herein by reference, is to further control the inrush of air when the stencil 26 is lifted from the receiving belt 20, keeping them apart sufficiently to prevent a partial vacuum therebetween and its related problems.

Upon transverse movement of the receiving belt 20 with its cargo of configured powder "C" thereon, along the guideways 66, a switch is actuated at the heating station 14 to stop movement in the frame 24 holding the receiving belt 20, and a signal is made by proper means to cause the receiving belt 20 to be lowered by frame height adjusting means 77 arranged between the frame 24 and the bushings which ride upon the guideways 66, into touching contact with the lower planar surface 44. Thereupon, the vacuum source is actuated, causing the vacuum in the orificii 46 to act to retain the receiving belt 20 against the heated lower planar surface 44 by the suction it causes against the receiving belt 20 to insure maximum heat transfer therebetween. The heating elements within the lower planar surface 44 and the radiant heating elements 54 in the upper planar surface 48 in the housing 50, which operate continuously to heat the powder on the receiving belt 20, cause the powder thereon to fuse into its three-dimensional configuration.

After an appropriate time, preferably up to about 25 seconds, and upon receipt of a proper signal the vacuum source is shut off, the receiving belt 20 and frame 24 are raised from the lower planar surface 44 by the frame height adjusting means 77, which may comprise a pressurizable piston and cylinder arrangement, and thereupon shuttled by unit 80 to the third work station 16 which is arrangeable to present a substrate such as an unreinforced shoe upper "U" to the viscous configuration on the receiving belt 20.

The receiving belt 20 in the third station 16, may (1) be lowered onto supporting contact by the lower planar block 56, by the frame height adjusting means 77, or (2) be held slightly thereabove and pushed into contact with the block 56 by the pallet 70, the receiving belt being chilled by the refrigeration means therefor, to solidify the incoming viscous configuration on the receiving belt 20. A shoe upper "U" in the shoe upper holding pallet 70, assembled in the upper support channel 60 may be then caused by the pressurizable piston and cylinder unit 64 to be pressed downwardly, the substrate, here an unreinforced shoe upper "U" having its "inner" side pressed and held momentarily against the now cooling but still adherable and tacky viscous configuration on the receiving belt 20. Upon reversal of the pressurizable piston and cylinder unit 64 to its uppermost position, the cooled viscous configuration, adhering to the "inner" portion of the shoe upper "U" is lifted from the smooth receiving belt 20. The substrate (shoe upper) holding pallet 70 may be withdrawn from the upper support channel 60 in the third work station, and a subsequent unreinforced/unstiffened or undecorated substrate such as a shoe upper installed therewithin. The receiving belt 20 now free of any fused powder configuration, may be returned to its position at the first work station. It is lifted slightly from the lower planar block 56 by the frame height adjusting means 77 to allow the frame 24 to clear the block 56, and by actuation, through proper means of the pressurizable piston and cylinder unit 80 to effectuate movement of the frame 24 on the guideways 66.

If it is desired to manufacture the fused configuration of powder by itself, then no substrate would be attached to the pallet 70, the configuration of fused powder being pressed, if desired, by the pad on the pallet, which pad would be made from a low friction material which would not be damaged by heat, which pressing would be used to "smooth out" any rough parts of the fused powder. The pad may be made of or covered by a porous material to insure a bubble free product. The fused powder might comprise a box toe for subsequent application to a shoe upper in a further manufacturing operation.

The types of powder "P" usable by and conditions of operating the present invention are shown by the following examples:

(A) A preferred utilization of the present invention comprises the reinforcement of stiffening of a shoe upper. A 35–50 mesh ionomer powder of the sodium cation type having: a melt index of 2.5, a flexural modulus of 51,000 psi, a heat softening temperature (Vicat) 63° C., with no additives. A cut-out in the planar surfaces is prepared to the particular shape desired and placed on an 8 mesh screen woven from 0.015 inch stainless steel wire. The choice of an 8 mesh screen represents a balance of opposing factors:

a - fine mesh produces a smooth action to the wiper blades;

b - too thick a screen wire size makes the scarf or taper edge too thick;

c - coarse, small diameter wire mesh presents less surface for residual powder particles to cling to or bridge across.

Spacer means on the bottom of the stencil are utilized for an approximately 0.040 inch thick fused product. Considering the bulk density and flow behavior of the powder, a 0.100 inch thick peripheral gasket is used on the bottom side of the stencil means. The scarf shim "S", on the lower support surface is adjusted thereon so as to distort the "no-spacer means" portion of the receiving belt into contact with the bottom surface of the stencil means as to provide a proper (desired) taper on the powder applied on the receiving belt and within the confines of the peripheral gasket.

In the heating station, the lower heating units are set for about 490° F. Each radiant heater above the receiving belt is set for about 600° F. surface temperature.

The deposition mechanism is actuated to allow an overall time of about 25 seconds for fusing the powder on the receiving belt, at which time, the product is transferred to the final station for application to the substrate, here the bottom of a shoe upper, then chilled by the chill plate as it is pressed thereagainst.

The final product for a box toe shoe upper is tapered from 0.012 inches thick at its scarf edge, to 0.035 inches thick along its full edge.

(B) A further example includes the preferred utilization above-described, having as additions in the powder 0.3% polyalkoxy tertiary amine as an antistatic agent, and 0.3% fine silica as a dryer and flow promoter, resulting in less residual powder on the screen and less electrostatic motion of the powder particles during the deposition process, as well as having the printed pattern of a higher quality. The product here may be 0.040 inches thick at its full edge.

C) A still further example includes the earlier described preferred embodiment (A) having as its additives: 0.05% conductive furnace black. The deposition behavior, flow behavior and product pattern are similar to example (B). The time for fusion at the heating station may be reduced here, to about 20 seconds, having a product thickness of about 0.040 inches.

(D) For a flexible box toe for mens' or womens' shoes, a 35 mesh low density polyethylene powder may be used, having a melt index of 22, a flexural modulus of 19,000 psi, a heat softening temperature (Vicat) of 83° C. with no additives. The lower heating block is raised to a temperature of about 400° F., the upper radiant heater at about 500° F. for a tapered product from about 0.012 to 0.035 inches and a heating (fusion) time of about 18 seconds.

(E) For a soft box toe for slippers, womens' and some childrens' shoes, a 35 mesh ethylene vinyl acetate copolymer, having a melt index of 9, a flexural modulus of about 13,500 psi and a heat softening temp. of about 59° C. The machine conditions are the same as those for example (D), in a heating (fusing) time of 12 seconds producing a tapered product of from about 0.012 to 0.035 inches thick.

(F) If the apparatus is to be used for throat reinforcement, eyelet stay or topline reinforcement for a shoe upper, then the preferred powder is 100 mesh nylon 12 and 0.3% polyalkoxy tertiary amine. The stencil screen would be of about 30 mesh size. This particular product is not tapered, therefore the gasket is arranged about the entire periphery of the cut-out, and is of uniform thickness, of the type of "dot" spacers 0.040 inches thick, utilizing machine conditions as in example A, with a heating time of 12 seconds and a print pattern thickness of 0.017 inches.

G) A thin film reinforcement similar to example F wherein a 100 mesh vinyl powder and 0.3% polyalkoxy tertiary amine powder is used, with a heat stabilizer if desired, having the same deposition means, conditions and results as in the previous example.

It is to be noted that the receiving surface may be in the form of an endless belt, which would be intermittently advancable between a pair of rolls, one at each end, the belt having one "run" which is disposed along the work stations as the above-described belt is transported therethrough on a frame arrangement. The powder deposited on the receiving surface may be useful for reinforcing or stiffening the toe areas of the shoe uppers or straps for shoes, or to provide reinforcing and/or color decorations on those shoes or boots.

Advantageously, the fused powder may be deposited on articles of cloth such as cap visors, sports gloves, collars, pajamas, knee or elbow patches or the like, where reinforcement/color or decoration is desired. The capability for a taper or variation in thickness of the applied powder permits variation in the flexibility of the substrate to which it is applied, very desirable for footwear applications.

Thus there has been shown a unique apparatus for applying reinforcing and stiffening or decorative material to portions of substrates, preferably flexible substrates such as the inner portion of a shoe upper, the material being a fusible powder which permits a more even, cleaner and more efficient manner of manufacturing shoes.

It is intended that the appended claims be considered as interpretive only, and not in a limiting sense.

We claim:

1. A machine for applying a fused configuration of powder on a shoe substrate comprising
    a surface for receiving a deposit of powder,
    means for supporting said receiving surface for displacement along a predetermined path,
    a stencil assembly having a horizontal extending stencil,
    powder dispensing means including,
        dispenser carriage means,
        means for displacing said dispenser carriage means between end positions,
        said dispenser carriage means having front and rear walls,
        wiper blade means secured to said front and rear walls and movable upwardly and downwardly,
    means for lowering the upstream wiper blade means to the closed position when said dispenser carriage means is displaced from either of said end positions,
    means for raising the downstream wiper blade means from its lowered position before said downstream wiper blade means passes across said stencil as said dispenser carriage means is displaced from either of said end positions.

2. A machine for applying a fused configuration of powder on a shoe substrate according to claim 1, wherein both of said wiper blade means are at the lower position when said dispenser carriage means is at an end position.

3. A machine for applying a fused configuration of powder on a shoe substrate according to claim 2, wherein said means comprises means for gradually raising said downstream wiper blade means as said dispenser carriage means is displaced between the end position.

* * * * *